(12) United States Patent
Williams

(10) Patent No.: US 11,833,531 B2
(45) Date of Patent: Dec. 5, 2023

(54) TELESCOPIC VEHICLE SURFACE CLEANING DEVICE

(71) Applicant: KAUTEX TEXTRON GMBH & CO. KG, Bonn (DE)

(72) Inventor: Aaron Edward Luke Williams, Cardiff (GB)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 352 days.

(21) Appl. No.: 16/754,618

(22) PCT Filed: Oct. 5, 2018

(86) PCT No.: PCT/EP2018/077143
§ 371 (c)(1),
(2) Date: Apr. 8, 2020

(87) PCT Pub. No.: WO2019/072714
PCT Pub. Date: Apr. 18, 2019

(65) Prior Publication Data
US 2020/0353487 A1    Nov. 12, 2020

(30) Foreign Application Priority Data

Oct. 9, 2017 (EP) .................................. 17195419

(51) Int. Cl.
*B60S 1/52* (2006.01)
*B60S 1/56* (2006.01)
(Continued)

(52) U.S. Cl.
CPC ............... *B05B 1/24* (2013.01); *B05B 15/74* (2018.02); *B60S 1/528* (2013.01); *B60S 1/56* (2013.01)

(58) Field of Classification Search
CPC ............ B60S 1/528; B05B 1/24; B05B 15/74
See application file for complete search history.

(56) References Cited

U.S. PATENT DOCUMENTS 4,088,269 A * 5/1978 Schlick ..................... B60S 1/52
219/505
6,186,156 B1   2/2001 Schlein
(Continued)

FOREIGN PATENT DOCUMENTS

CN       104160779     11/2014
DE         7415380     11/1975
(Continued)

OTHER PUBLICATIONS

DE10048014—Machine Translation (Year: 2002).*
(Continued)

*Primary Examiner* — Marc Lorenzi
(74) *Attorney, Agent, or Firm* — Grossman, Tucker, Perreault & Pfleger, PLLC

(57) ABSTRACT

A telescopic vehicle surface cleaning device comprising a washing unit, the washing unit comprising a nozzle carrier housing, a nozzle carrier and at least one fluid nozzle with at least one nozzle aperture, the nozzle carrier being movable relative to the nozzle carrier housing between first and second positions, the first position being a rest position and the second position being an extended position, the device further comprising a heating unit, the heating unit being configured as a heating sub assembly of the device and the heating unit comprising a heating element carrier with an electrically resistive heating element, the heating element carrier being fixed relative to the nozzle carrier housing and being configured such that the heating element is arranged in front of and adjacent to the nozzle aperture in the rest position of the nozzle carrier such that an air gap remains between a heating surface of the heating element and the nozzle aperture.

10 Claims, 7 Drawing Sheets

(51) Int. Cl.
*B05B 1/24* (2006.01)
*B05B 15/74* (2018.01)

(56) References Cited

U.S. PATENT DOCUMENTS

| | | | | |
|---|---|---|---|---|
| 6,501,907 | B1* | 12/2002 | Rehs | B60S 1/52 |
| | | | | 392/502 |
| 9,913,319 | B2 | 3/2018 | Timmermann et al. | |
| 2003/0066907 | A1* | 4/2003 | Drouillard | B60S 1/522 |
| | | | | 239/284.1 |
| 2014/0042243 | A1* | 2/2014 | Kim | B60S 1/48 |
| | | | | 239/130 |
| 2015/0034621 | A1 | 2/2015 | Timmermann et al. | |
| 2016/0339875 | A1 | 11/2016 | Ina et al. | |
| 2017/0120875 | A1* | 5/2017 | Kong | B60S 1/52 |
| 2017/0355352 | A1* | 12/2017 | Bulgajewski | H05B 3/42 |
| 2020/0001833 | A1 | 1/2020 | Lomer | |

FOREIGN PATENT DOCUMENTS

| | | |
|---|---|---|
| DE | 4237856 | 10/1993 |
| DE | 19902432 | 8/2000 |
| DE | 10048014 | 4/2002 |
| DE | 102009006280 | 7/2010 |
| DE | 102017103158 | 8/2018 |
| EP | 0174521 | 3/1986 |
| JP | 2017-61317 | 3/2017 |
| JP | 2017-128181 | 7/2017 |

OTHER PUBLICATIONS

Office Action from related Japanese Appln. No. 2020-520133, dated Jun. 21, 2021. English translation attached.
International Search Report, dated May 9, 2019, received in corresponding PCT Application No. PCT/EP2018/077143.
International Preliminary Report on Patentability, dated Apr. 23, 2020, received in corresponding PCT Application No. PCT/EP2018/077143.

* cited by examiner

TELESCOPIC VEHICLE SURFACE CLEANING DEVICE

FIELD

The invention refers to a heated telescopic vehicle surface cleaning device.

BACKGROUND

Heated vehicle surface cleaning devices are generally known in the art. Sometimes such cleaning devices are also referred to as so-called pop-up washing nozzles which are normally integrated in the front or rear bumpers or in the hatch of a passenger car. These pop-up nozzles are mostly utilized for cleaning headlamps, rear windows or camera lenses of passenger cars.

Windscreen cleaning is normally performed via static nozzles attached to the bonnet of the car arranged on top of the bonnet or arranged concealed in a gap between the bonnet and the windscreen of the car.

Under freezing conditions, washing fluid tends to freeze. It is therefore commonly known to provide heated nozzles. A heated nozzle is for example disclosed in DE 199 024 32 A1. This reference discloses a nozzle arrangement comprising a nozzle with a washing liquid channel and a heating element and a connecting part with at least one connector for a hose and one for the nozzle. The connecting part is designed to accommodate at least two electrical leads and means for contacting the leads with the heating element are arranged in the connecting part and in the heated nozzle so that the nozzle is connected mechanically and electrically to the connecting part when fitted into it.

An electrical element integrated into the nozzle or the nozzle carrier close to the aperture of the nozzle might be appropriate for static nozzles but is less suitable for dynamic ones such as the aforementioned pop-up nozzles. That is mainly because such a design would require exposed electrical contacts or sliding electrical connections which would be subject to corrosion.

EP 0 174 521 A1 discloses a heated nozzle carrier which includes a heater body integrated into the nozzle carrier and surrounding a fluid channel within the nozzle carrier. Directly attached to the heater body is a PTC heating element connected to electrical leads which are guided into the nozzle carrier. This design also has the aforementioned drawbacks.

Electrical elements which require wiring are also not always suitable for cleaning units which are movable relative to the bodywork of the vehicle because the electrical wiring would be subject to frequent bending. A person skilled in the art will appreciate that frequently bent wires tend to break due to fatigue.

There is also a need for providing a design for telescopic nozzles which can be easily assembled and fitted into the bodywork of a vehicle. There is a certain need for modularity of the design so that it is possible to easily provide either heated or non-heated versions of cleaning units.

SUMMARY

It is therefore an object of the current invention to provide a heated telescopic vehicle surface cleaning device which avoids the above-referred drawbacks and which may easily be assembled and mounted.

A vehicle surface in the sense of this application may be any exposed surface of the vehicle onto which a cleaning fluid is to be propelled. That might be a windscreen, the exposed surface of a sensor, a camera lens, a headlamp screen, a rearview mirror or the like.

A cleaning fluid in the sense of the current application may be a liquid and/or gas. More specifically a cleaning fluid according to the current patent application may be water, an aqueous solution or for example air. A cleaning fluid in the sense of the current patent application may be also a mixture of water and air or a mixture of a liquid cleaning fluid and air. An aqueous solution in the sense of the current patent application might be for example water including additives such as alcohols or surfactants.

According to one aspect of the current invention there is provided a telescopic vehicle surface cleaning device comprising a washing unit and a cleaning unit. The washing unit and the cleaning unit are two separate modules, the heating unit being configured as a heating sub assembly of the device.

In particular, the fact that the heating unit is a separate sub assembly to the washing unit makes it possible to provide one single unitary design for a telescopic washing unit which may be provided as a heated version as well as a non-heated version.

Preferably, the telescopic vehicle surface cleaning device is configured such that the heating unit may be arranged/mounted stationary relative to a telescopic nozzle carrier of the washing unit. This configuration allows to establish the required electrical connections in the form of electrical leads connected to the heating unit without running the risk of excessively bending and moving the electrical leads as the heating unit is arranged stationary relative to the nozzle carrier.

According to one aspect of the current invention there is provided a telescopic vehicle surface cleaning device comprising a washing unit, the washing unit comprising a nozzle carrier housing, a nozzle carrier and at least one fluid nozzle with at least one nozzle aperture, the nozzle carrier being movable relative to the nozzle carrier housing between first and second positions, the first position being a rest position and the second position being an extended position, the device further comprising a heating unit, the heating unit being configured as a heating unit sub assembly of the device and the heating unit comprising a heating element carrier with a preferably electrically resistive heating element, the heating element carrier being fixed relative to the nozzle carrier housing and being configured such that the heating element is arranged in front of or adjacent to the nozzle aperture in the rest position of the nozzle carrier such that an air gap remains between a heating surface of the heating element and the nozzle aperture.

According to this concept, the heating element carrier remains stationary while the nozzle carrier moves relative to the nozzle carrier housing between a rest position and an extended position which is the position in which a cleaning fluid may be propelled onto the surface to be cleaned.

The heating element is preferably arranged such that in the rest position of the nozzle the nozzle aperture may be heated by heat transfer through the air gap between said heating surface of the heating element and the nozzle aperture. Said heating surface may be arranged in close proximity to the nozzle aperture. The distance between the heating surface and the nozzle aperture may be in the order of 2 to 4 mm.

If the ambient temperature falls below a given threshold, the fluid nozzle may be heated in the rest position which is sufficient to keep the nozzle aperture ice free under freezing conditions. During a cleaning cycle the nozzle aperture is only exposed during a relatively short time span in which heating cannot be performed due to the fact that the nozzle aperture is not positioned in front of and adjacent to the heating surface.

The heating surface might be provided by a heat conductive element which is thermally coupled to an electrically resistive element.

In one preferred embodiment the heating element is configured as a self regulating heating element, most preferably as a PTC resistor. The PTC resistor may be in direct contact with and preferably directly attached to a heat radiation body providing said heating surface.

Preferably, the heat radiation body is made from a thermally conductive material chosen from a group of materials comprising aluminum, copper, brass, magnesium, nickel or alloys thereof.

The heating element carrier may be press-fitted and/or snap-fitted on to the nozzle carrier housing. The heating element carrier may for example be detachably mounted to the nozzle carrier housing.

The heating element carrier itself may be configured as a heat radiation body. For instance, the heating element carrier can be configured as a jacket made from a thermally conductive material, for example as a metal jacket or as jacket from a thermoplastic material filled with thermally conductive particles.

Alternatively, the heating element carrier can be made of a thermoplastic material to which the heating element and/or a heat radiation body are attached.

The heating element carrier may comprise a metallic insert forming a heat radiation body which preferably is press fitted into a receiving opening of the heating element carrier.

The heating element, preferably designed as a self regulating heating element and more preferably in the form of a PTC resistor may be directly attached to the metallic insert.

The heating element carrier may comprise a pocket in which the heating element is mounted. The pocket itself may be configured as a metal part.

Preferably, the telescopic vehicle cleaning device according to the current invention comprises at least one extendable and retractable piston which is slidably arranged within the nozzle carrier housing and which is extendable by virtue of the pressure of a cleaning fluid. The piston may form part of the nozzle carrier. Alternatively, the nozzle carrier may be a separate part attached to the leading end of the piston.

Preferably, the nozzle carrier housing is connectable to a cleaning fluid source.

BRIEF DESCRIPTION OF THE DRAWINGS

Advantageous embodiments of the invention are hereinafter described by way of example with reference to the accompanying drawings in which.

DETAILED DESCRIPTION

Figure 1:
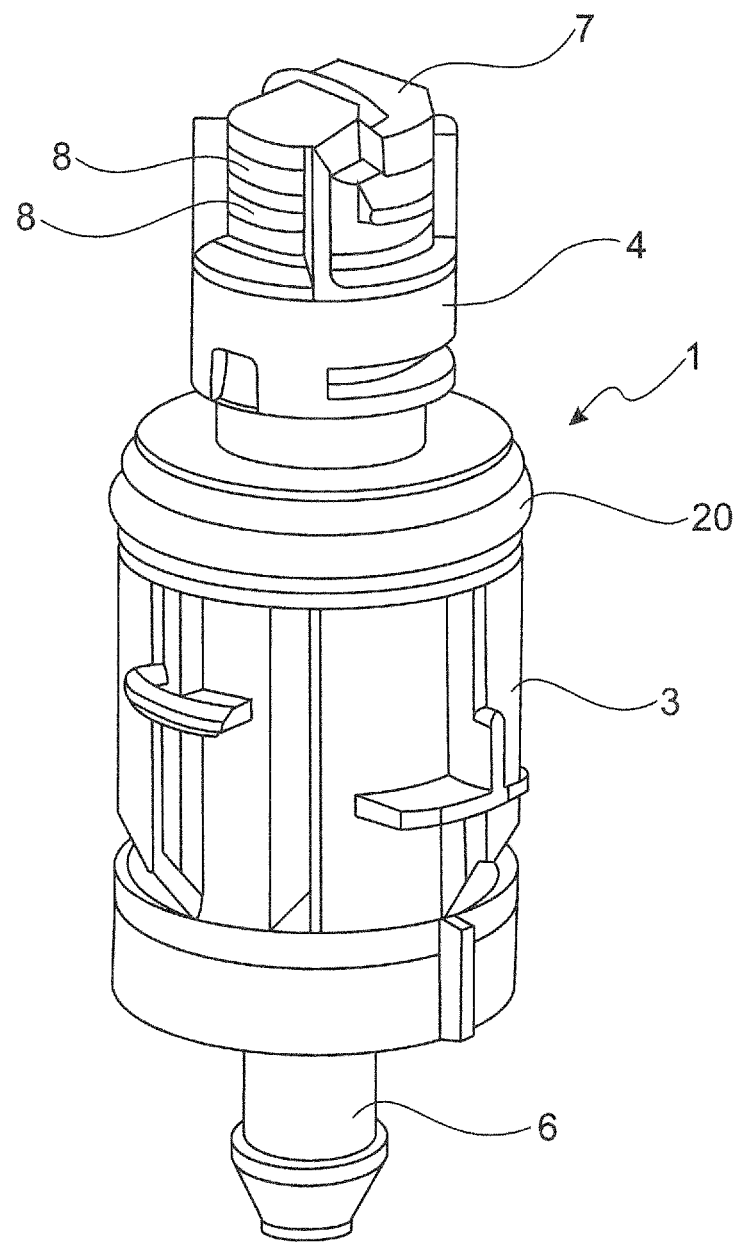
FIG. 1 shows a washing unit of the telescopic vehicle surface cleaning device without a heating unit.

Referring to the embodiment shown in FIGS. 1 to 4 the telescopic vehicle surface cleaning device comprises a washing unit 1 and a heating unit 2 which are configured as two separate functional units. FIG. 1 shows only the washing unit 1 which also could be a nonheated washing unit and which is generally ready for being mounted into a vehicle and which functions without the heating unit 2.

Figure 2:
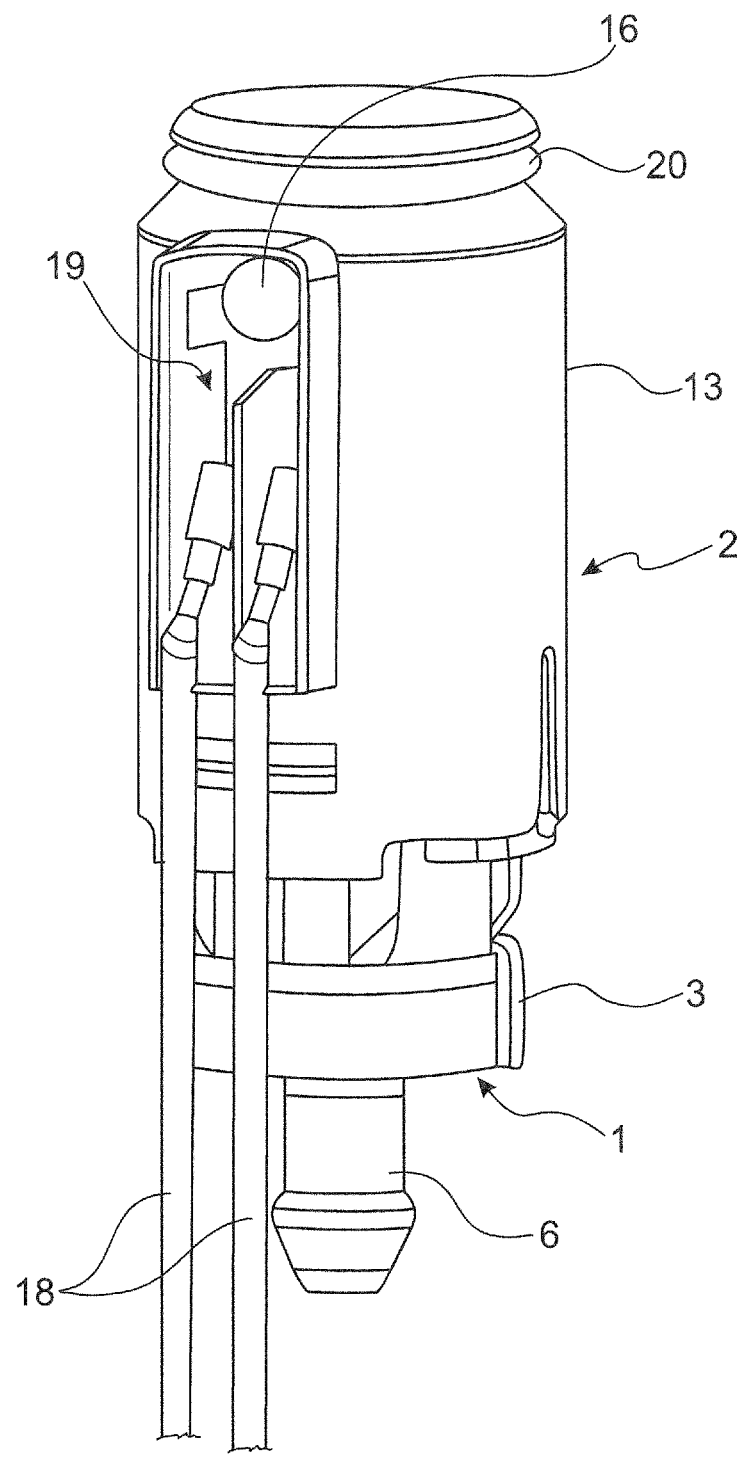
FIG. 2 shows a telescopic vehicle surface cleaning device according to a preferred embodiment of the current invention with the heating unit being mounted.

FIG. 2 shows an assembly of the washing unit 1 and heating unit 2, the heating unit 2 being snap-fitted onto the washing unit 1.

The washing unit 1 comprises a nozzle carrier housing 3 and a nozzle carrier 4 integrally formed with a piston 5 slidably arranged within the nozzle carrier housing. The nozzle carrier housing 3 is designed as a cylinder in which the piston 5 may be reciprocated. The nozzle carrier housing 3, the piston 5 or the nozzle carrier 4 respectively can be injection moulded from thermoplastic material.

The nozzle carrier housing 3 comprises a nipple 6 for receiving a hose as a cleaning fluid supply conduit which is part of a cleaning fluid circuit within the vehicle. The cleaning fluid supply conduit and other parts of the cleaning fluid circuit such as a pump are not shown in the drawings. It will be appreciated that these elements are generally known in the prior art and common to a person skilled in the art. The nozzle carrier 4 may assume first and second positions relative to the nozzle carrier housing 3, a first position being a rest position, shown in FIG. 3 and a second position being an extended position which is the cleaning position in which a nozzle 7 is exposed. The nozzle comprises one or more nozzle apertures 8 communicating with a cleaning fluid channel 9 which in turn communicates with a hollow space 10 within the nozzle carrier housing 3. The nozzle carrier 4 and the nozzle apertures 8 are integrally formed, i.e. have a one piece design. A person skilled in the art will appreciate that the nozzles might be designed as so called eye balls which may be press-fitted into correspondingly shaped receptacles in the nozzle carrier 4. A cleaning fluid pump, which is not shown, provides via a cleaning fluid supply conduit a cleaning fluid to the nozzle carrier housing 3 and the cleaning fluid is supplied through the cleaning fluid channel 9 to the nozzle 7 and exits the nozzle apertures 8.

Figure 3:
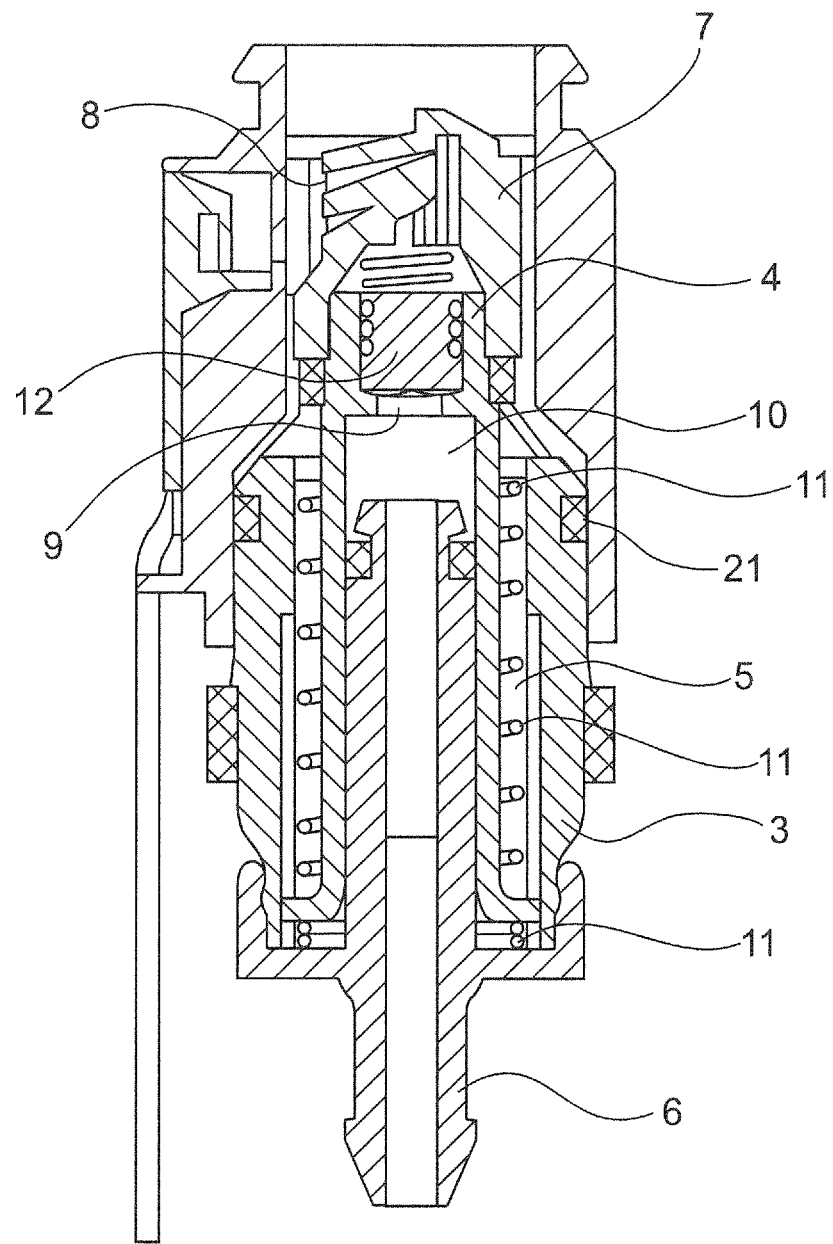
FIG. 3 shows a longitudinal section through the telescopic vehicle surface cleaning device of FIG. 2 with the nozzle carrier in the rest position.

In the rest position which is shown in FIG. 3 the piston 5 is balanced within the nozzle carrier housing 3 by two coil springs 11. A check valve 12 closes the fluid channel 9 and initially blocks a fluid communication between the nozzle 7 and the hollow space 10. In the event a cleaning fluid is delivered from a cleaning fluid source under pressure into the nozzle carrier housing 3 the cleaning fluid enters into the hollow space 10 and the fluid pressure acts on the check valve 12. Due to the fluid pressure acting on the check valve 12 the piston 5 will be urged upwards against the biasing force of the upper spring coil 11 until the nozzle carrier 4 assumes the extended position shown in FIG. 4 in which the piston 5 abuts a peripheral stop surface within the nozzle carrier 3. Further pressurization causes the valve body of the check valve 12 to be lifted from its valve seat and thus fluid communication between the hollow space 10 and the nozzle 7 will be established.

The heating unit 2 which is configured as a sub-assembly is provided for keeping the nozzle aperture 8 ice free under freezing conditions or to defrost the nozzle apertures if they should get clogged under freezing conditions. The heating unit 2 comprises a heating element carrier 13 which in one embodiment is configured as a sleeve which may be snap-fitted on to the nozzle carrier housing 3. As this is shown in FIG. 3, and the rest position of the nozzle carrier for the nozzle 7 is completely surrounded and protected by the heating element carrier 13.

Figure 5:
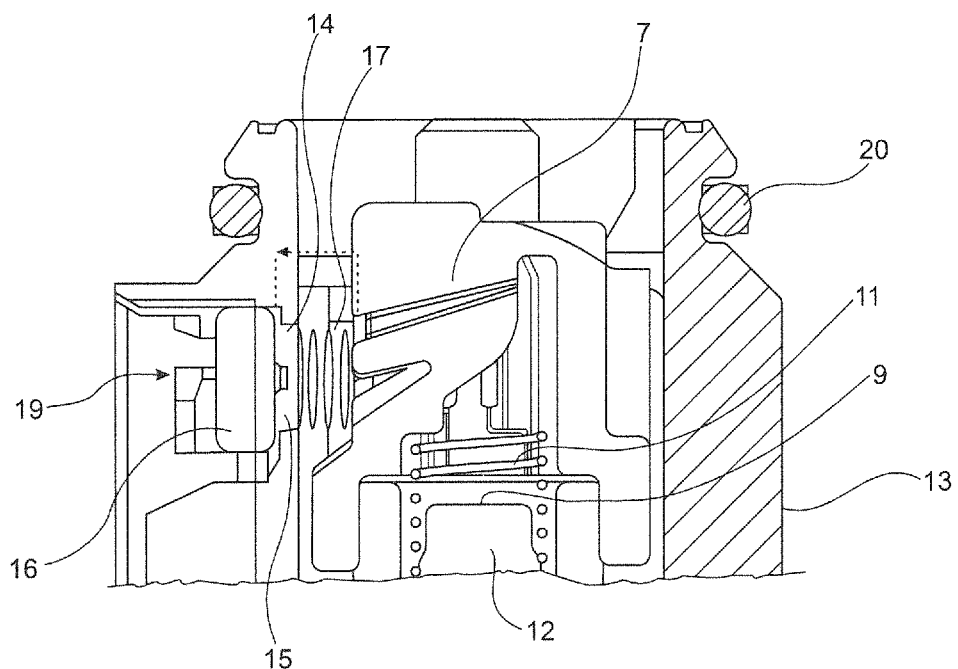
FIG. 5 shows an enlarged detail of the telescopic vehicle surface cleaning device according to FIGS. 2 to 4.

FIG. 5 shows an enlarged view of the upper part of the telescopic vehicle surface cleaning device according to FIGS. 2 and 3.

The heating element carrier 13 comprises a cylindrical bore 14 into which a metallic to insert 15 is press fitted. A PTC resistor 16 is attached to the rear side of the metallic insert 15. The rear side is that side of the metallic insert 15 which faces away from the nozzle aperture 8. The metallic insert 15 is configured as a heat radiation body which upon energization of the PTC resistor 16 transfers the heat generated by the PTC resistor 16 through an air gap 17 between the nozzle 7 and the heating element carrier 13. The PTC resistor 16 and electrical wiring 18 leading to and from the PTC resistor 16 are arranged within a heater compartment 19 forming part of the heating element carrier 13.

The metallic insert 15 is arranged in front of and adjacent to the nozzle aperture 8 in the rest position of the nozzle carrier 3 such that the air gap 17 remains between a heating surface of the metallic insert and the nozzle aperture 8.

The upper part of the heating element carrier 13 comprises a sealing element 20 which is designed for meeting with a corresponding sealing surface within the bodywork of the vehicle.

The nozzle carrier unit 3 is sealed within the cylindrical heating element carrier 13 by a sealing element 21 extending within a peripheral groove of the sealing element carrier 3.

Figure 4:
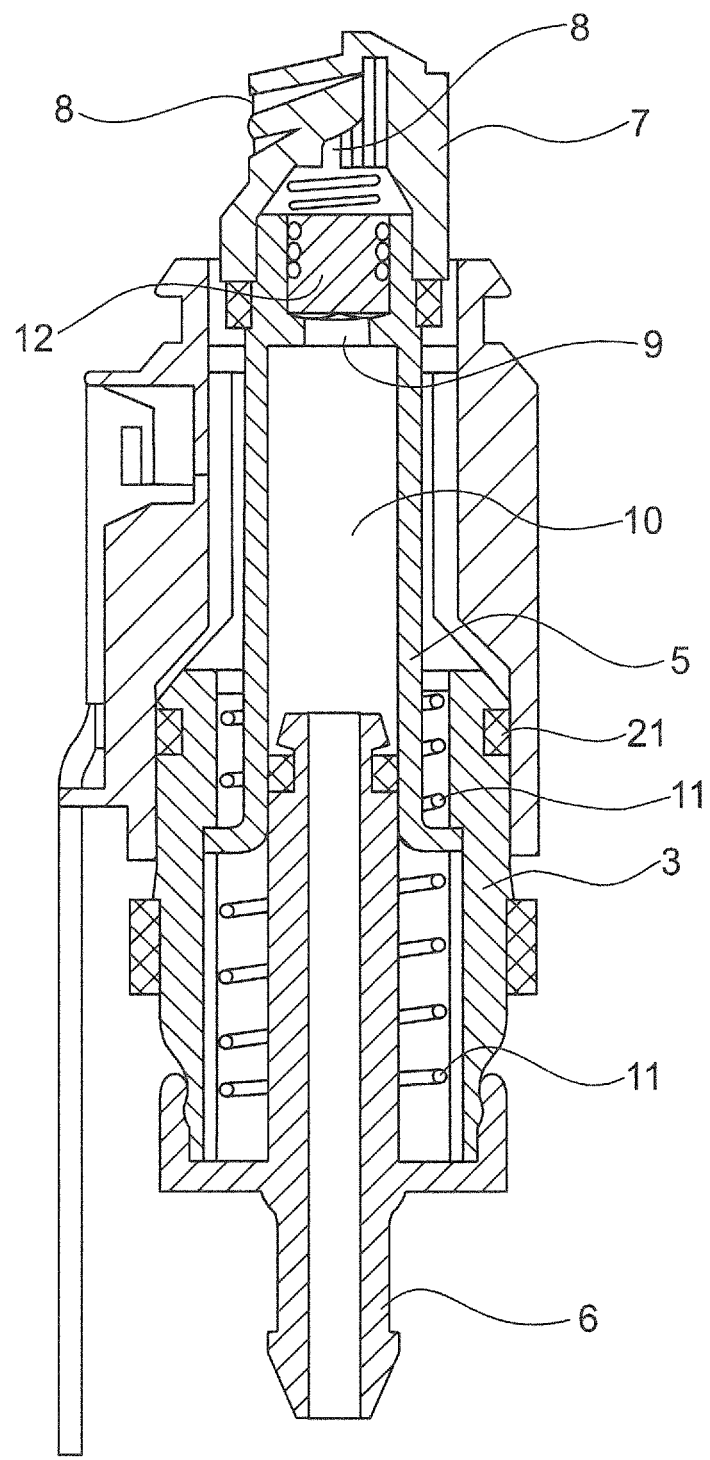
FIG. 4 shows a longitudinal section of the telescopic vehicle surface cleaning device of FIG. 3 with the nozzle carrier in the extended cleaning position.
Figure 6:
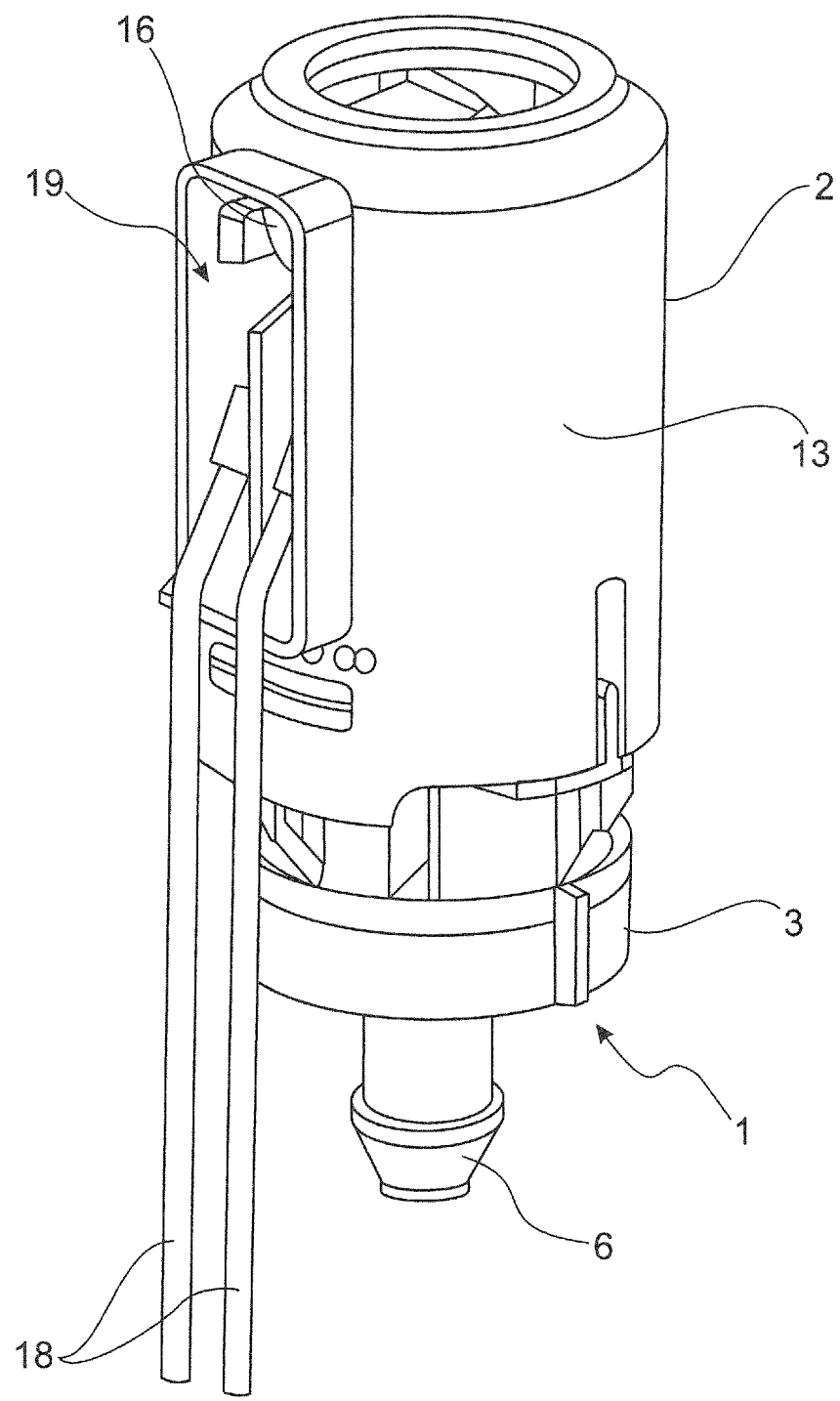
FIG. 6 shows another design variant of the telescopic vehicle surface cleaning device according to the current invention.

The design of the telescopic vehicle surface cleaning device according to FIG. 6 is slightly different from the design shown in FIG. 2 however, in terms of the inventive concept the washing unit 1 and the heating unit 2 corresponds to that of FIGS. 2 and 4 and same parts thereof are denoted by same reference numerals.

Figure 7:
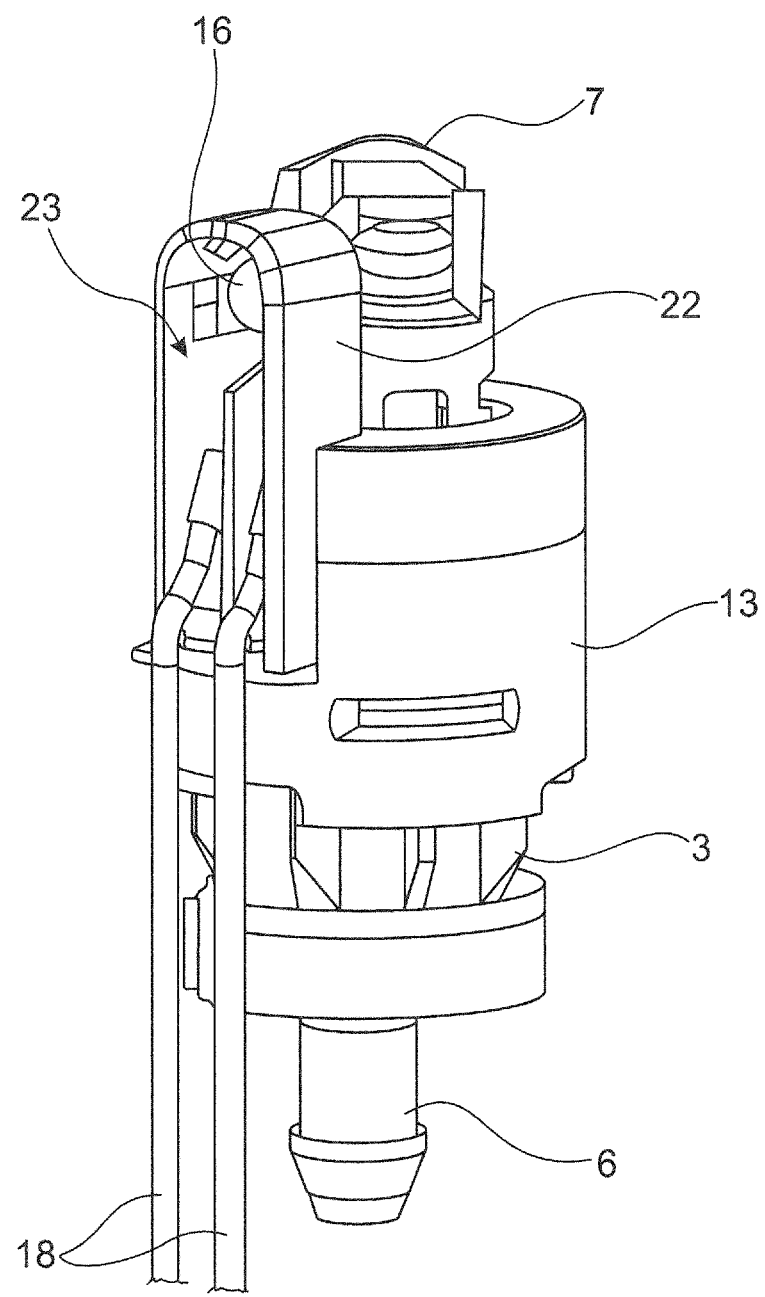
FIG. 7 shows a second embodiment of the telescopic vehicle surface cleaning device according to the invention.

The telescopic vehicle surface cleaning device according to FIG. 7 has yet another design. The heating element carrier 13 of the embodiment according to FIG. 7 does not fully enclose the nozzle 7. The heating element carrier 13 comprises a yoke 22 forming a pocket 23 into which the self-regulating heating element, i.e. the PTC resistor 16 and a heat radiation body are mounted. The yoke 22 extends from a sleeve like basis of the heating element carrier 13 which is snap-fitted onto the nozzle carrier 3. Again, the heating element carrier 13 may be made from thermoplastic material. The yoke 22 itself may be made from a thermally conductive metal such as for example copper or aluminum in order to enhance heat transfer to the nozzle 7. The yoke may have on the heating element carrier 13 an angled position relative to a longitudinal axis of the nozzle carrier housing 3. Again, the washing unit 1 has the same design as the washing unit one according to the previous embodiments. With the embodiment according to FIG. 7 also same parts are denoted by the same reference numerals.

REFERENCE NUMERALS 1 washing unit
2 cleaning unit
3 nozzle carrier housing
4 nozzle carrier
5 piston
6 nipple
7 nozzle
8 nozzle aperture
9 fluid channel
10 hollow space within the nozzle carrier housing
11 coil springs
12 check valve
13 heating element carrier
14 bore in heating element carrier
15 metallic insert
16 PTC resistor
17 air gap
18 electrical wiring
19 heater compartment
20 sealing element
21 sealing element
22 yoke
23 pocket

What is claimed is:

1. A telescopic vehicle surface cleaning device, comprising:
   a washing unit, the washing unit comprising:
      a nozzle carrier housing,
      a nozzle carrier, and
      at least one fluid nozzle with at least one nozzle aperture, the nozzle carrier being movable relative to the nozzle carrier housing between first and second positions, the first position being a rest position and the second position being an extended position,
   a heating unit, the heating unit being configured as a heating sub assembly of the device and the heating unit comprising:
      a heating element carrier with an electrically resistive heating element, the heating element carrier being fixed relative to the nozzle carrier housing and being configured such that the heating element is arranged in front of and adjacent to the nozzle aperture in the rest position of the nozzle carrier such that an air gap remains between a heating surface of the heating element and the nozzle aperture, and
      a heat radiation body,
      wherein the heating element carrier comprises a yoke forming a pocket in which the heating element is mounted and the yoke is made from a thermally conductive metal.

2. The telescopic vehicle surface cleaning device according to claim 1, wherein the heating element is configured as a self-regulating heating element.

3. The telescopic vehicle surface cleaning device according to claim 1, wherein the heat radiation body is made from a thermally conductive material chosen from a group of materials comprising aluminum, copper, brass, magnesium, nickel or alloys thereof.

4. The telescopic vehicle surface cleaning device according to claim 1, wherein the heating element carrier is snap-fitted onto the nozzle carrier housing.

5. The telescopic vehicle surface cleaning device according to claim 1, wherein the heating element carrier is configured as a sleeve or jacket.

6. The telescopic vehicle surface cleaning device according to claim 5, wherein the heating element carrier is sealed with respect to the nozzle carrier housing.

7. The telescopic vehicle surface cleaning device according to claim 1, wherein the heating element carrier is made of thermoplastic material.

8. The telescopic vehicle surface cleaning device according to claim 1, wherein the heat radiation body is a metallic insert which is press fitted into a receiving opening of the heating element carrier.

9. The telescopic vehicle surface cleaning device according to claim 8, wherein the heating element is a PTC resistor directly contacting the metallic insert.

10. The telescopic vehicle cleaning device according claim 1, wherein the nozzle carrier comprises at least one extendable and retractable piston which is slidably arranged within the nozzle carrier housing and which is extendable by pressure of a cleaning fluid.

* * * * *